(12) United States Patent
Chowdhary et al.

(10) Patent No.: US 12,259,896 B1
(45) Date of Patent: Mar. 25, 2025

(54) SEARCH AND SEMANTIC SIMILARITY DOMAIN DETERMINATION

(71) Applicant: Intuit Inc., Mountain View, CA (US)

(72) Inventors: Pooja Rajan Chowdhary, Mountain View, CA (US); Pratik Lala, Tracy, CA (US); Vijay Thomas, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/592,512

(22) Filed: Feb. 29, 2024

(51) Int. Cl.
*G06F 16/2457* (2019.01)
*G06F 16/22* (2019.01)
*G06F 16/334* (2025.01)
*G06F 16/953* (2019.01)

(52) U.S. Cl.
CPC .... *G06F 16/24578* (2019.01); *G06F 16/2237* (2019.01); *G06F 16/3347* (2019.01); *G06F 16/953* (2019.01)

(58) Field of Classification Search
CPC ............ G06F 16/3347; G06F 16/2237; G06F 16/24578; G06F 16/953
See application file for complete search history.

(56) References Cited

U.S. PATENT DOCUMENTS 12,008,026 B1 * 6/2024 Sanz ................... G06F 16/3347

* cited by examiner

*Primary Examiner* — Etienne P Leroux
(74) *Attorney, Agent, or Firm* — Lathrop GPM LLP

(57) ABSTRACT

A method includes generating a new user query embedding for a new user query received from a user, obtaining an indexed user query matching the new user query from a search engine index, a vector index corresponding to the indexed user query, and a relevancy score corresponding to the indexed user query. The method further includes selecting a vector structure corresponding to the vector index from a plurality of vector structures in a vector store, obtaining, from the vector structure, a result embedding matching the new user query embedding, transmitting, by a user query answer service to an answer generation model, the result embedding and receiving, by the user query answer service, an answer to the new user query from the answer generation model.

20 Claims, 9 Drawing Sheets

| Query | Vector index |
|---|---|
| Weather in Paris? | Get_Weather |
| Book a ride for me. | Book_Ride |
| Today's football match score? | Get_Sports_Score |
| Schedule an appointment at 10 AM tomorrow. | Set_Appointment |
| When does the next episode airs? | TV_Show_Info |
| Call Lucy. | Initiate_Phone_Call |
| What's the news today? | Get_News_Update |
| Turn off the living room lights. | Control_Home_Automation |
| Recommend a good book. | Provide_Book_Recommendation |
| Find Italian restaurants near me. | Restaurant_Search |
| Translate 'Hello' to Spanish. | Translate_Text |
| Start a 30-minute workout. | Start_Workout |
| Play some jazz music. | Play_Music |
| How to make lasagna? | Recipe_Search |
| What's my schedule for the day? | Get_Today's_Schedule |

702 SEARCH ENGINE INDEX

704 LABELED DATASET

| Query | Vector Index |
|---|---|
| Find a bookstore near me | Bookstore_search |

*FIG. 7A*

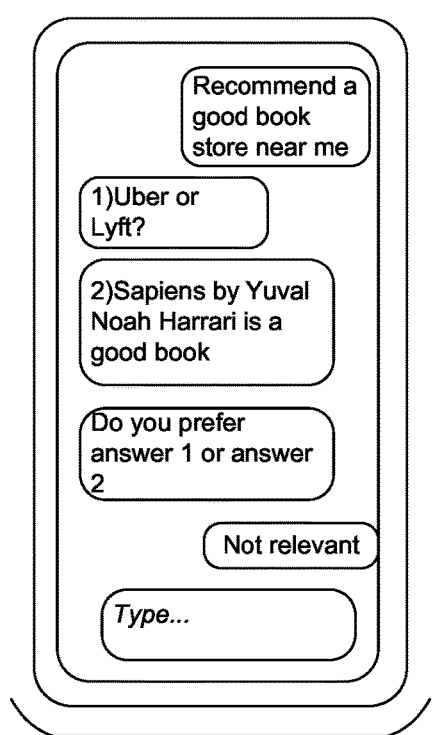

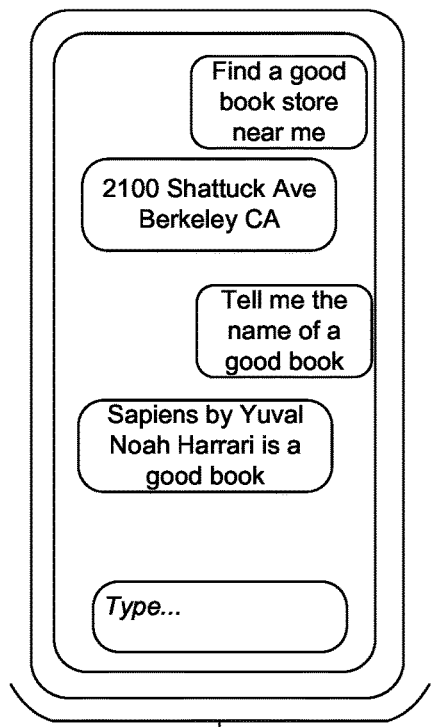

SEARCH AND SEMANTIC SIMILARITY DOMAIN DETERMINATION

BACKGROUND

Enterprise environments may have varied forms of data accessible to users, accessible across various platforms. Users may interact in a request and response dialogue mode with enterprise environments using natural language. Because natural language is used, at the enterprise side, language models may be used to interpret the user's request and formulate or generate a response. In certain situations, large language models mischaracterize the user's request. For example, the large language model may not accurately determine which content domains are most relevant to the user's request. Consequently, the large language model may generate answers based on one or more content domains that are irrelevant to the user's request, returning a response that is irrelevant or wrong.

SUMMARY

In general, in one aspect, one or more embodiments relate to a method. The method includes generating a new user query embedding for a new user query received from a user, obtaining an indexed user query matching the new user query from a search engine index, a vector index corresponding to the indexed user query, and a relevancy score corresponding to the indexed user query. The method further includes selecting a vector structure corresponding to the vector index from a plurality of vector structures in a vector store, obtaining, from the vector structure, a result embedding matching the new user query embedding, transmitting, by a user query answer service to an answer generation model, the result embedding and receiving, by the user query answer service, an answer to the new user query from the answer generation model.

In general, in one aspect, one or more embodiments relate to a system. The system includes at least one computer processor, and a user query answer service executing on the computer processor. The user query answer service includes an embedding model and a search engine. The system further includes a data repository. The data repository includes a user query repository, a vector store, a content domain store, and an answer generation model. The embedding model is configured to cause the computer processor to generate a new user query embedding for a new user query received from a user. The search engine is configured to cause the computer processor to obtain an indexed user query matching the new user query from a search engine index, a vector index corresponding to the indexed user query and a relevancy score corresponding to the indexed user query. The vector store is configured to cause the computer processor to select a vector structure corresponding to the vector index from a plurality of vector structures in the vector store and obtain a result embedding matching the new user query embedding from the vector structure. The user query answer service is configured to cause the computer processor to transmit the result embedding to the answer generation model and receive an answer to the new user query from the answer generation model.

In general, in one aspect, one or more embodiments relate to a method. The method includes generating a new user query embedding for a new user query received from a user, obtaining an indexed user query matching the new user query from a search engine index, obtaining a vector index corresponding to the new user query from the search engine index, and selecting a vector structure corresponding to the vector index from a plurality of vector structures from a vector store. The method further includes obtaining a result embedding similar to the new user query embedding from the vector structure, determining a result similarity score for the result embedding, and determining an index similarity score for the vector index based on the result similarity score. The method further includes determining a composite score corresponding to the vector index, based on the relevancy score corresponding to the indexed user query and the index similarity score corresponding to the vector index. The method further includes generating an answer to the new user query based on the result embedding from the vector structure corresponding to the vector index if the composite score is higher than a composite score threshold.

Other aspects of the invention will be apparent from the following description and the appended claims.

BRIEF DESCRIPTION OF DRAWINGS

FIG. 7A shows data structures illustrating a search engine index and a labeled dataset, in accordance with one or more embodiments.

FIG. 7B depicts an example of an interaction between a user and an automated system response in accordance with one or more embodiments.

Like elements in the various figures are denoted by like reference numerals for consistency.

DETAILED DESCRIPTION

Figure 1A:
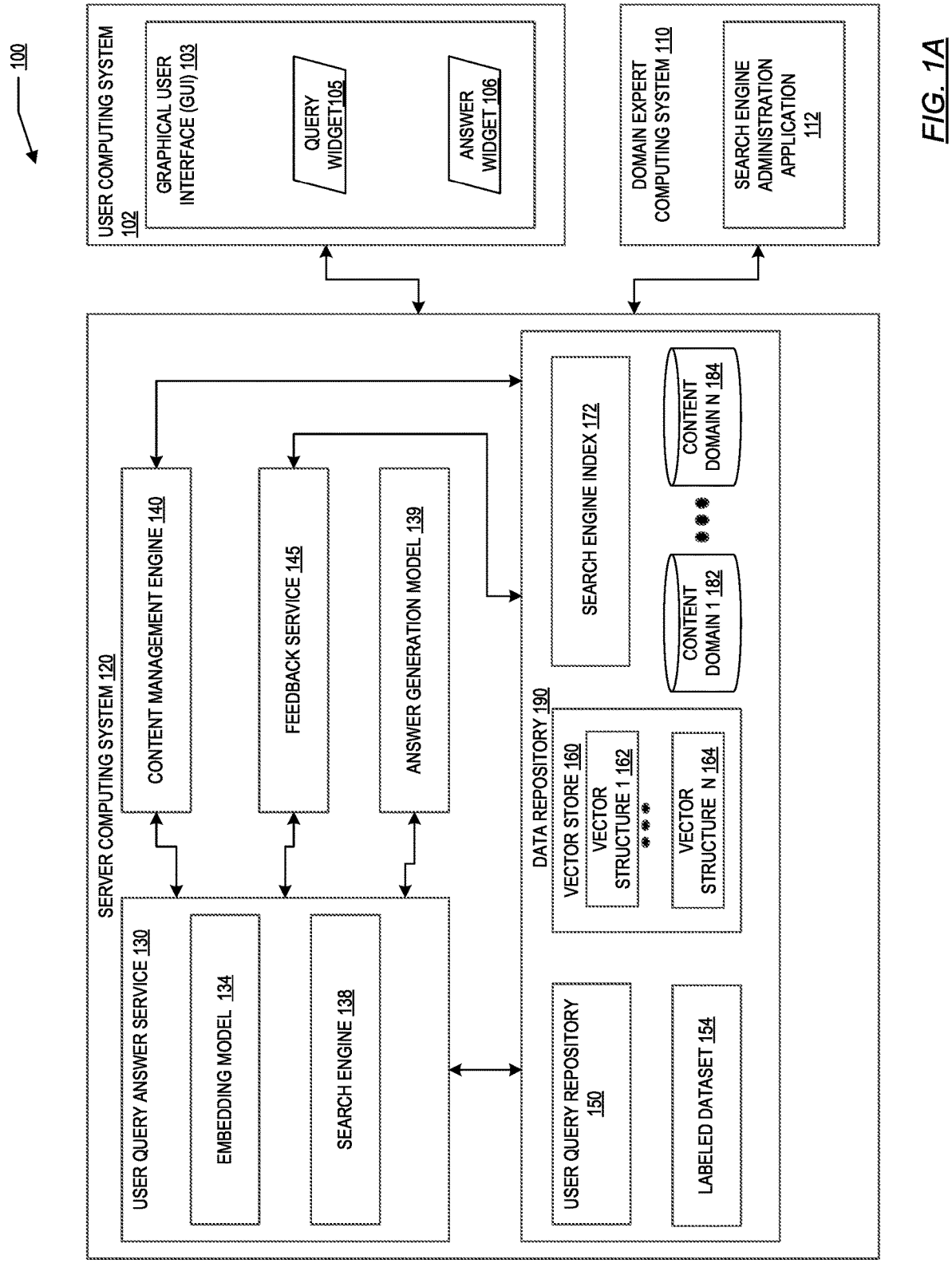
FIG. 1A is a diagram of a system in accordance with one or more embodiments.

In general, embodiments are directed to determining the one or more content domains relevant to a user query in natural language before transmitting the user query to a language model. The content domains are the possible topics or subject areas that are relevant to the user query. One or more embodiments include a search engine having a search engine index of previously received user queries and corresponding relevant content domain identifiers. The search engine index is searched for previously received user queries that match the user query received from the user. Accordingly, at least one corresponding relevant content domain identifier is obtained from the search index. Thus, when the language model processes the user query, the relevant content domain is used by the language model to generate a more relevant natural language answer to the user query. Other aspects of the system and method to determine the relevant content domain corresponding to a user query are described in the Figures and relevant portions of the current specification.

A user query is a question, exclamation, or statement from a user, whether written or oral. A user query may include one or more utterances. An utterance is an uninterrupted chain of spoken or written natural language. The term "utterance" pertains to anything spoken or written by a user that starts and ends with a pause.

A relevant content domain of a user query is the specific topic or subject to which the user query pertains. A relevant content domain of a user query encompasses the scope, context and intent of a user query. The intent of a user query refers to the underlying purpose or goal behind the query. The intent represents what the user is trying to achieve or understand through the user query. Language models analyze context, keywords and patterns to understand the intent of a user query and provide relevant answers. By way of an example, if a user enters a query "Generate a function in Python to compute an average", the content domain that is most likely to contain a relevant response to the user query may be a code manual for the Python programming language. The aforementioned content domain is "relevant" to the user query and produces a relevant response that pertains to the intent of the query, which may be a code snippet in the Python programming language that computes an average. On the other hand, a content domain containing information or documentation about mathematical functions may not be relevant to the user query as the intent of the user query does not pertain to pure mathematics, instead, the intent pertains to programming in Python.

Turning to the figures, FIG. 1 shows a diagram of a system (100) that illustrates an embodiment of a server computing system (120) communicatively coupled to a user computing system (102) and a domain expert computing system (110). The server computing system includes a data repository (190), a user query answer service (130), a content management engine (140), a feedback service (145), and an answer generation model (139). Each of these components is described herein.

The user computing system (102) is a computing system configured to present a graphical user interface (103) to a user. In one embodiment, the graphical user interface includes at least one query widget (105) that is configured to receive written or spoken user queries by a user. The query widgets present the user with graphical artifacts that are configured to receive the user query in a natural language. The term, natural language, comports with the standard definition used in the art to refer to a language developed naturally, rather than computer coding language. Some examples of query widgets (105) include forms, chatbots, dialog boxes and variations thereof.

The graphical user interface (103) includes at least one answer widget (106) that presents results from the server computing system (120). The answer widget (106) may be configured to display the results. The answer widget (106) may also include interactive graphical artifacts that are configured to receive a selection from a user to provide feedback on the results. For example, the interactive graphical artifacts may include a checkbox, button, or other interactive visualization artifacts to rate or rank the presented results based on the relevance of the results to the user query.

The domain expert computing system (110) is a computing system configured to execute a search engine administration application (112). In one embodiment, the search engine administration application (112) is configured to present previously received user queries and content domain identifiers to a domain expert. The search engine administration application (112) is further configured to present interactive graphical artifacts that are configured to receive selections from the domain expert that match a previously received user query to a content domain identifier.

The server computing system includes a data repository (190). The data repository (190) is any type of storage unit and/or device (e.g., a file system, database, data structure, or any other storage mechanism) for storing data. Further, the data repository (190) may include multiple different, potentially heterogeneous, storage units and/or devices.

In one embodiment, the data stored by the data repository (190) includes content domain stores (e.g., content domain 1 store (182), content domain N store (184)). The content domain store is a storage structure that stores the content of a single particular domain. For example, the content in the content domain store may be documents, such as text and image, Javascript Object Notation (JSON) files, database records, or any other unstructured or structured documents. By way of example, content domain 1 store (182) may include content pertaining to the code base of a software development environment in an enterprise while content domain N store (184) may include content pertaining to journal articles or an enterprise wiki. law and regulation used in tax analytics. Wikis are knowledge management resources and serve as community websites in some instances.

The data repository includes a vector store (160). The vector store (160) is a specialized database that stores vector structures (e.g., vector structure 1 (162), vector structure N (164)). The vector store (160) is configured to perform vector searches. The vector structures are data structures that contain embeddings. Generally, an embedding is a dense numerical representation of real-world objects and relationships, expressed as a vector. The vector space quantifies the semantic similarity between categories of objects and relationships. Natural language constructs, for example, words, phrases, and sentences, may be converted to embedding representations for machine learning models. Embeddings may be used to translate high-dimensional sparse vectors representing words into compact representations that capture the semantic relationship between words. Converting utterances in user queries and content from content domain stores to embeddings and other similar vector representations provides machine learning models with a better understanding of relationships between words.

The embeddings in the vector store are representations of the utterances in content from a particular content domain store. Further, the vector structures contain corresponding vector indices that identify the content domain store from which the embeddings are generated. Examples of vector stores include Pgvector, Pinecone, Qdrant, and other extant variations. The vector structures are described in further detail in reference to FIG. 2.

The data repository (190) further includes a user query repository (150). In one embodiment, the user query repository (150) stores historical data including previously received user queries, query embeddings, and result embeddings obtained from the vector store. The query embeddings are embeddings of user queries. Namely, the query embeddings are vector representations of user queries. The result embeddings correspond to the previously received user queries.

In one or more embodiments, the user query repository (150) may further include vector indices corresponding to relevant results corresponding to the past user queries. The user query repository (150) further includes a labeled dataset (154). In one embodiment, the labeled dataset (154) is used to generate an index for the search engine (138). The labeled dataset (154) is described in further detail in reference to FIG. 2.

Continuing with the server computing system, the user query answer service (130) includes an embedding model (134), and a search engine (138). The user query answer service (130) is operatively coupled to an answer generation model (139), the data repository (190), and feedback service (145). In one embodiment, the user query answer service (130) includes computer-implemented code and programs to orchestrate the components (134) and (138) at run-time to generate an answer to the user query. Further, the user query answer service (130) is configured to receive a user query from the user computing system. Additionally, the user query answer service (130) is configured to transmit a natural language answer to the user computing system. The user query answer service (130) may be a standalone application, part of another application, a service connected to one or more applications, or another type of software. The components (134) and (138) are described in further detail with reference to FIG. 1.

The embedding model (134) is operatively coupled to the content management engine (140) via the user query answer service (130). The embedding model (134) is configured to generate an embedding of one or more utterances. For example, the embedding model (134) may be Universal Sentence Encoder (USE), Word2Vec, GloVE, BERT, Fast-Text, convolutional neural networks VGG, Inception and other types of embedding models or combinations thereof. In one embodiment, the embedding model (134) generates embeddings corresponding to the utterances in content from a content domain store. Additionally, the embedding model (134) generates embeddings corresponding to the utterances in content from a user query.

The system (100) shows the embedding model (134) as a part of the user query answer service (130). In one or more embodiments (not shown), the embedding model (134) may be an independent component in the server computing system (120), a remote component that is communicatively coupled to the server computing system (120) and variations thereof.

The search engine (138) is operatively and communicatively coupled to the content management engine (140) and the feedback service (145) via the user query answer service. In one embodiment, the search engine (138) is an analytics engine with inverted index capability. An inverted index is a data structure used in information retrieval systems to efficiently retrieve documents that contain a specific term or set of terms. In one or more embodiments, the search engine (138) may have a distributed architecture, with one or more instances executing on the server computing system (120). The system (100) shows the search engine (138) as a part of the user query answer service. In one or more embodiments (not shown), the search engine (138) may be an independent component in the server computer system (120), a remote component that is communicatively coupled to the server computing system (120) and variations thereof. Some examples of search engines include ElasticSearch®, Opensearch, Algolia®, Typesense®, Meilisearch, Solr, Vespa® and the like.

In continuing reference to FIG. 1, the server computing system includes a content management engine (140). The content management engine (140) is operatively coupled to the data repository (190), the search engine (138), and the embedding model (134) via the user query answer service (130). In one embodiment, the content management engine (140) is configured to populate the search engine with documents from the content domain store in a compatible format. For example, the content management engine may retrieve a natural language document from the content domain store and convert the natural language document into a Javascript Object Notation (JSON) document that is accepted by the search engine. In one or more embodiments, the content management engine (140) may be further configured to convert content from a content domain store into natural language format that is accepted by the embedding model for embedding generation. For example, the content management engine (140) may be configured to retrieve a JSON document from the content domain store and convert the JSON document to natural language. Additionally, in one embodiment, the content management engine (140) is configured to populate the vector store (160) in the data repository (190). The content management engine (140) may be a standalone application, part of another application, a service connected to one or more applications, or another type of software.

The server computing system (120) includes the feedback service (150) of the server computing system. The feedback service (150) is operatively coupled to the search engine (138) via the user query answer service (130). Further, the feedback service (150) is operatively coupled to the data repository. In one embodiment, the feedback service (150) is configured to update the labeled dataset from the user query repository. The feedback service may be a stand-alone application, part of another application, a service connected to one or more applications, or another type of software.

The server computing system (120) includes an answer generation model (139). The answer generation model (139) is operatively coupled to the user query answer service (130) and the data repository (190). In one embodiment, the answer generation model (139) is configured to generate an answer to the user query in natural language. The answer generation model (139) is further configured to use the user query and at least one result embedding to generate an answer for a user query. In one example, the answer generation model (139) is a large language model. Large language models include BERT-Large, GPT-2, GPT-3 and the like.

While FIG. 1A shows a configuration of components, other configurations may be used without departing from the scope of the invention. For example, various components may be combined to create a single component. As another example, the functionality performed by a single component may be performed by two or more components.

Figure 1B:
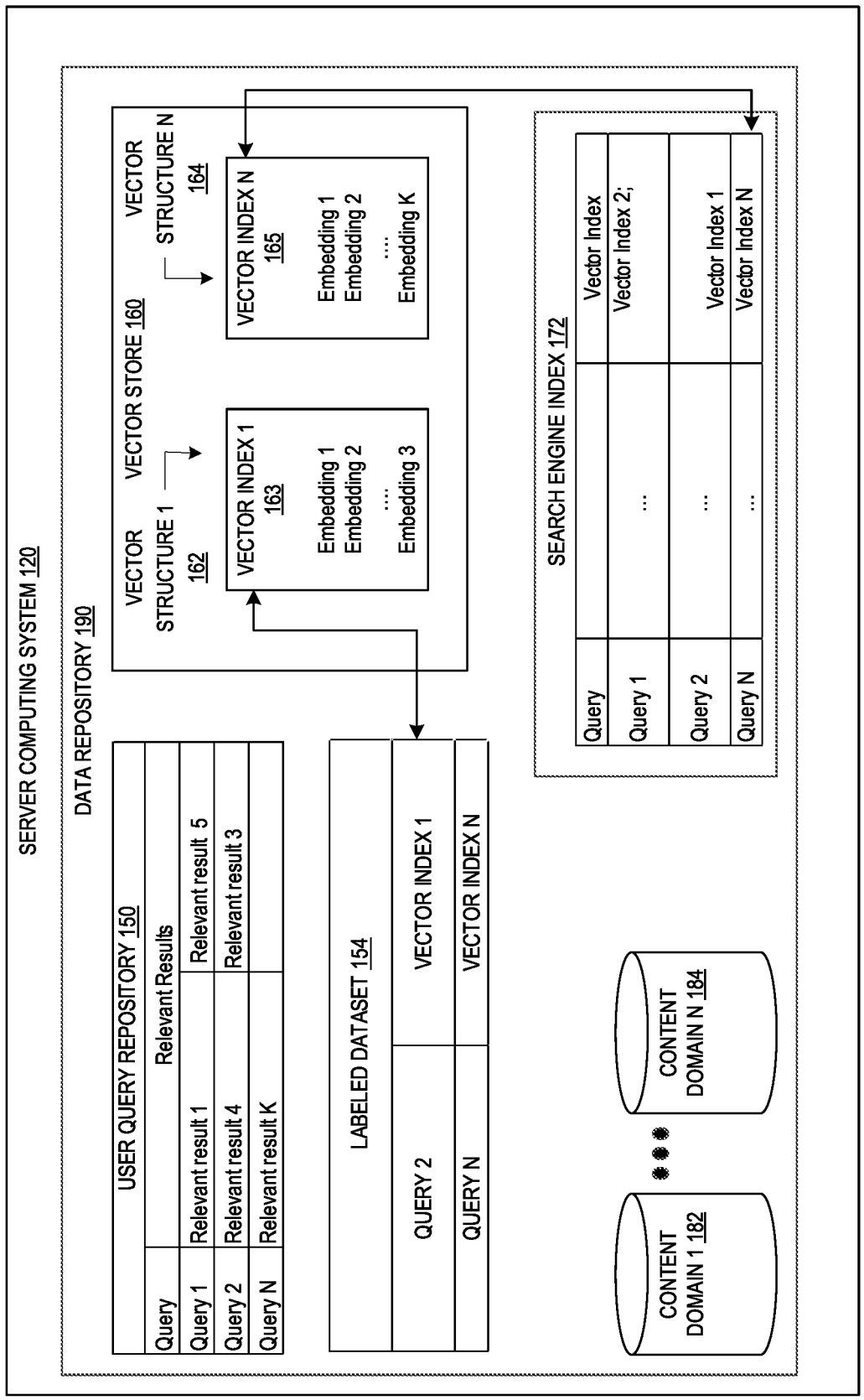
FIG. 1B is a detailed view of a data repository of the system shown in FIG. 1 in accordance with one or more embodiments.

FIG. 1B shows a detailed view of the labeled dataset (154), a vector structure, for example, vector structure 1 (162), and the search engine index (172). More particularly, the diagram of FIG. 1B illustrates the linking of the vector structures, labeled dataset and the search engine index via a common identifier, namely, the vector index. In the context of the labeled dataset and the search engine index, the vector index identifies the content domain that is relevant to the user query. In other words, the vector index is the content domain identifier of the content domain that is relevant to the user query. In the context of the vector structure, the vector index identifies the content domain from which the embeddings in the vector structure are generated. The vector structure (e.g., vector structure 1 (162), vector structure N (164)) is a data structure that includes a set of embeddings and a vector index (e.g., vector index 1 (163), vector index N (165)) for a particular corresponding content domain store (e.g., content domain 1 store (182), content domain N store (184)). In one embodiment, a one-to-one relationship exists between vector structures and content domain stores.

For example, vector structure 1 (162) includes one or more embeddings (e.g., embeddings 1 through X) and a vector index 1 (163). Similarly, vector structure N (164) includes one or more embeddings (e.g., embeddings 1 through Y) and vector index N (165).

The vector index is a unique index identifier of the corresponding content domain store. Vector index 1 (163) through vector index N (164) correspond to content domain stores content domain 1 (182) through content domain N (184). In other words, the vector index of a vector structure identifies the matching content domain store from which the embeddings of the vector are generated. For example, vector structure 1 (162) includes embeddings 1 through X and vector index 1 (163). The vector index 1 (163) is a unique index identifier identifying content domain 1 (182). Accordingly, embeddings 1 through X of vector 1 (162) are generated from the content in content domain 1 (182).

Thus, searching the vector store with a query embedding of a user query yields result embeddings that are similar to the user query. In the current specification, the term "match" between a user query embedding and a result embedding refers to greater than a threshold degree of similarity between the user query embedding and the result embedding. In the context of the vector store, the terms "match" and "similar" are interchangeable and refer to greater than a threshold degree of similarity between the user query embedding and the result embedding.

The labeled dataset (154) shown in FIG. 1B includes at least one user query, and at least one known vector index. The known vector index identifies the content domain store that is the relevant domain of the user query In particular, the known vector index corresponds to a vector structure that contains embeddings corresponding to the content in a content domain store, that is identified, by the vector index, as relevant to the intent of the user query.

The labeled dataset (154) is used by the search engine to generate a search engine index (172). The search engine index is a data record that maps user queries to vector indexes from the vector store. The vector indexes identify the content domains from which the embeddings in the corresponding vector structures of the vector store are generated.

FIGS. 2 through 6 show flowcharts in accordance with one or more embodiments. The flowcharts may be performed by the components described in reference to in FIG. 1. While the various steps in these flowcharts are presented and described sequentially, at least some of the steps may be executed in different orders, may be combined or omitted, and at least some of the steps may be executed in parallel. Furthermore, the steps may be performed actively or passively.

Figure 2:
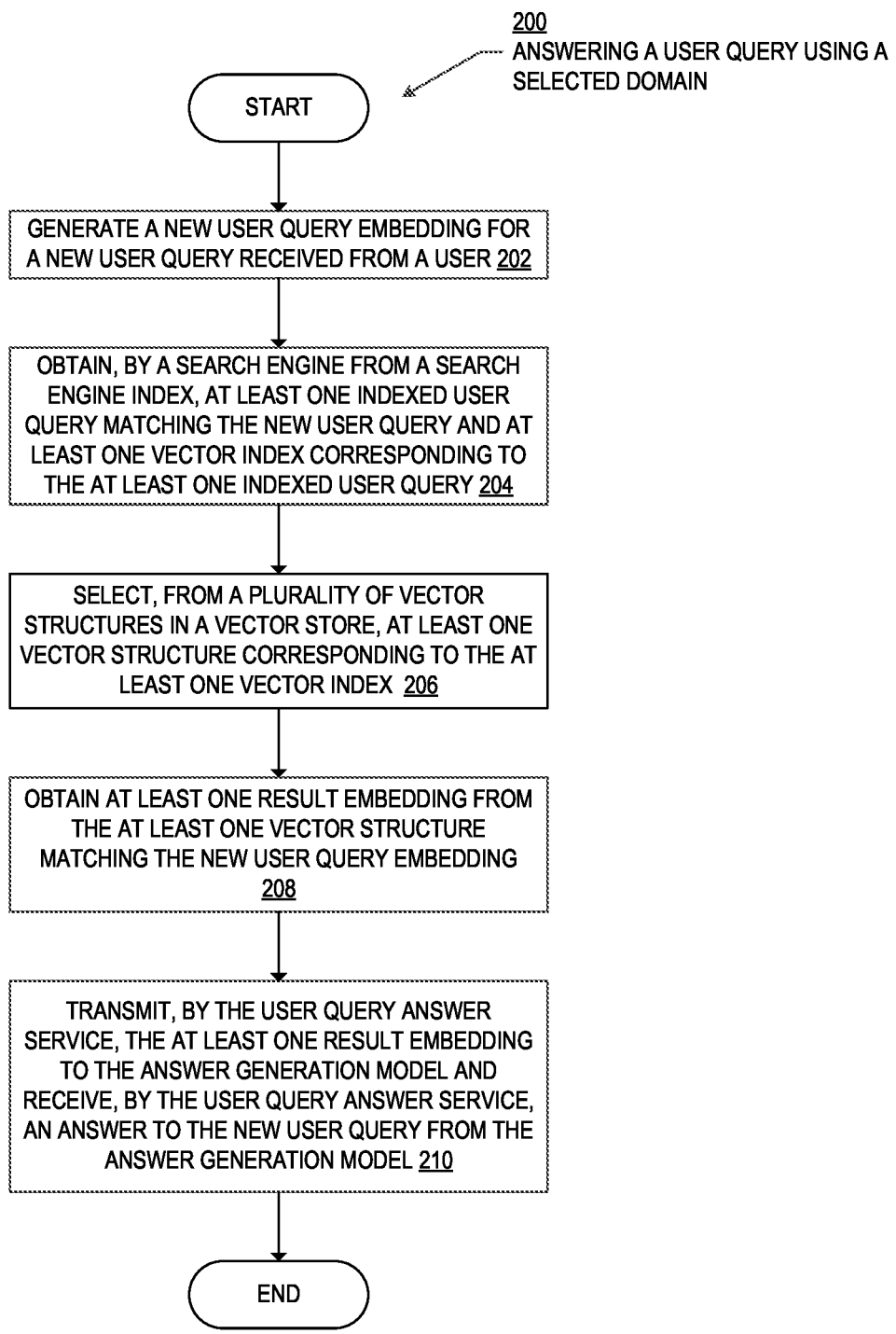
FIG. 2 is a flowchart for generating an answer to a query in accordance with one or more embodiments.

FIG. 2 is a flowchart showing a method (200) for answering a query from a selected domain. One or more of the components of the system (100) shown in FIG. 1 may perform the steps of the method (200), alone or in combination. In Block 202, a new user query is received from a user and a new user query embedding for the new user query is generated. In one embodiment, the user enters one or more utterances forming the user query into a query widget. The one or more utterances are transmitted to the server computing system. In one embodiment, the user query answer service receives the user query from the user computing system. Subsequently, the user query answering service triggers the embedding model to generate a new user query embedding for the new user query.

In Block 204, at least one indexed user query matching the new user query and at least one vector index corresponding to the indexed user query is obtained by the search engine from the search engine index. In one embodiment, the user query answer service is configured to trigger the search engine to perform a search based on the new user query. Further, the search engine is configured to search the indexed user queries of the search engine index to obtain a match to the new user query based on one or more search algorithms. Some examples of search engine algorithms used to search the search engine index include TF-IDF, BM25, LM Dirichlet, DFI and the like. The search is performed using, as a factor, in determining the matching results, the frequency of the terms in the new user query and the frequency of the terms in the indexed user queries. Terms with higher frequencies are more likely to be determined by the search algorithm as matching.

In Block 206, a vector structure corresponding to the vector index is selected from the vector structures in the vector store. In one embodiment, the user query answer service is configured to send the vector index obtained in Block 204 and the new user query embedding obtained in Block 202 to the vector store. Further, the vector store identifies a vector structure corresponding to the vector index. In one embodiment, one or more vector indices may be obtained in Block 204. The vector indices may correspond to the indexed user query that matches the new user query. Accordingly, the vector store may identify one or more vector structures corresponding to the vector indices.

In Block 208, a result embedding similar to the new user query embedding is obtained from the vector structure. By way of an overview, a similarity algorithm is applied to the result embedding and the new user query embedding to generate a similarity score. The similarity score may be compared to a threshold. If the similarity score is greater than the threshold, then the result embedding is determined to match. In one embodiment, the vector store is configured to search the vector structures corresponding to the vector indices to obtain one or more result embeddings matching the new user query embedding.

In Block 210, the result embedding obtained in Block 208 from the vector structure is transmitted to the answer generation model, and the answer to the new user query is received by the user query answer service from the answer generation model. In one embodiment, the vector store may return one or more result embeddings obtained from one or more vector structures to the user query answer service. In one embodiment, the user query answer service is configured to send the result embeddings to the answer generation model via, for example, an Application Programming Interface (API) function call. Further, the user query answer service transmits the answer to the user computing system. The user computing system, in turn, may present the answer to the user via the user query answer widget.

Figure 3:
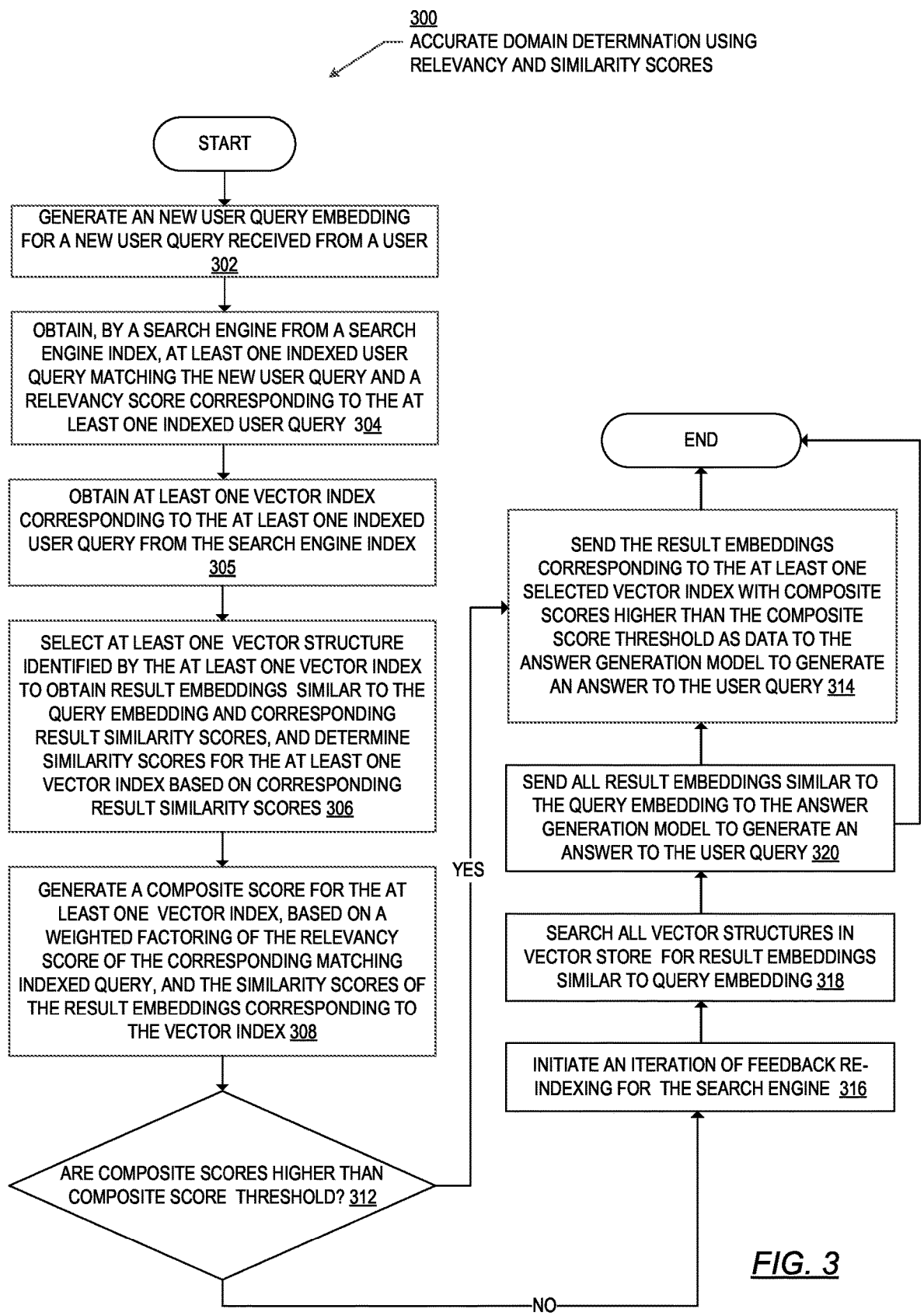
FIG. 3 is a flowchart for generating an answer to a query based on a composite score, in accordance with one or more embodiments.

FIG. 3 shows a flowchart for a method (300) of determining an intended response domain using relevance and similarity scores. One or more of the components of the system (100) shown in FIG. 1 may perform the steps of the method (300), alone or in combination. The method (300) uses scores to rate results. The method (300) entails the calculation of a composite score and a comparison of the composite score to a composite score threshold. The method (300) further entails the initiation of the iterative feedback re-indexing of the search engine at runtime, thereby implementing a continuous update process for the search engine. The continuous update process improves the quality, relevance and accuracy of the generated answer.

Turning to FIG. 3, in Block 302, a new user query embedding is generated by the embedding model for a new user query. In one embodiment, the user query answer service is configured to preprocess the user query. Preprocessing may entail the cleaning and tokenizing of the user query, and other steps that format the user query into a form processable by the embedding model. In one embodiment, the user query answer service triggers the embedding model to generate the embedding from the user query. The embedding model generates an embedding for the user query by mapping the words in the query to a vector space where each word is represented by a vector. The vectors are generated using a mathematical algorithm that captures the meaning and context of the words based on their surrounding words in the text. The generated vectors are combined to create an embedding for the user query. The resulting embedding is a mathematical representation of the meaning and context of the user's query that can be used for further analysis or processing.

In Block 304, at least one indexed user query matching the new user query is obtained by the search engine from the search engine index, and a relevancy score corresponding to the matching indexed user query is determined. In one embodiment, the search engine searches the search engine index based on one or more search algorithms. By way of example, the search engine may perform a search on the search index based on the search algorithm TD-IDF. The relevancy score for each indexed user query is determined by considering the term frequency, namely, the number of times a term in the new user query appears in the indexed user query, and the inverse document frequency, namely, how rare a term in the new user query is across each of the indexed user queries. In one embodiment, the search algorithm executed by the search engine may identify one or more indexed user queries that match the new user query. Accordingly, the search engine may determine relevancy scores corresponding to each indexed user query that matches the new user query.

In Block 305, a vector index corresponding to the matching indexed query from Block 304 is obtained from the search engine index. In one embodiment, the search engine obtains the vector index from the search engine index. In one embodiment, one or more vector indices may correspond to the matching indexed query.

In Block 306, a vector structure corresponding to the vector index obtained in Block 305 is selected by the vector store. In one embodiment, the user query answer service sends a request to the vector store with the new user query embedding obtained in Block 302 and the vector index obtained in Block 305.

The vector store selects a vector structure corresponding to the vector index and searches the vector structure to obtain result embeddings that are most similar to the user query embedding. Additionally, the vector store may generate a result similarity score for each result embedding. The result similarity score of a result represents the accuracy and relevance of the result embedding match to the query embedding. In one embodiment, one or more vector indices are sent by the user query answer service with the new user query embedding. The vector store selects vector structures corresponding to the vector indices and searches the selected vector structures to obtain result embeddings that are most similar to the query embedding.

Further, a similarity score is determined corresponding to each result embedding. Furthermore, index similarity scores are generated for the vector indices based on the corresponding result similarity scores.

In one embodiment, the vector store determines the similarity of a result embedding to the query embedding through top-K matching. Top-K matching is an algorithm that returns the top K elements from a collection of elements based on a certain criterion. The criterion may include a highest score, a most frequent element, or the most relevant search result. Further, in one or more embodiments, the top-K matching algorithm may rank the relevancy of the result using selection, sorting or other heuristic algorithms. In one or more embodiments, the vector store may use Hierarchical Navigable Small World (HNSW), FLAT (brute force algorithm), Non-Metric Space Library (NMSLIB) and the like. Additionally index similarity scores may be determined by the user query answer service, for the one or more vector indices obtained in Block 305, based on the result similarity scores corresponding to each result embedding obtained from the vector structure corresponding to the vector index. For example, a first embedding and a second embedding from a first vector structure may be result embeddings that are obtained as top K matches to the user query embedding. Accordingly, the user query answer service determines the index similarity score for a first vector index corresponding to the first vector structure, based on the result similarity scores corresponding to embedding 1 and embedding 2.

Continuing to Block 308, a composite score is determined for the vector index obtained in Block 305. In one embodiment, the user query answer service computes the composite score based on the relevancy score of the matching indexed query obtained in Block 304 corresponding to the vector index, and the index similarity score for the vector index. In one embodiment, the composite score for the vector index is a weighted average of the index similarity score determined in Block 306 and the relevancy score determined in Block 304. In another embodiment, the user query answer service uses the relevancy score determined in Block 304 as a weighted multiplier for each result similarity score corresponding to the vector index. The user query answer service subsequently obtains a weighted average of the result similarity scores to obtain the final composite score for the vector index. In one or more embodiments, the weightage given to the relevancy score multiplier may be a static pre-determined value or may be determined dynamically in the runtime environment.

In Block 312, a composite score threshold is used to select vector indices having composite scores calculated in Block 308 via a comparison step. In one embodiment, a vector index is selected if the composite score corresponding to the vector index is higher than the composite score threshold. In one or more embodiments, the user query answer service may be configured to determine the composite score threshold. In one embodiment, the composite score threshold is configured by a human or other entity via configuration data pertaining to the user query answer service. In another embodiment, the composite score threshold is configured via a GUI presented to the user. Control is passed to Block 314 if at least one vector index has a composite score that is higher than the composite score threshold. Control is passed to Block 316 if no vector index has a composite score that is higher than the composite score threshold. In one embodiment, the user query answer service is configured to perform the comparison step of Block 312 and orchestrate the alternate control pathways.

In Block 316, an iterative feedback re-indexing via the feedback service for the search engine is initiated. In one embodiment, the user query answering service is configured to launch the feedback service. In one or more embodiments, the feedback service may be configured to run as a background process, activated by the user query answer service on an as-needed basis. Namely, the process may be activated when comparison step of Block 312 determines that no vector index has a composite score that is higher than the composite score threshold.

In Block 318, a fallback step is performed. The fallback step is used when the composite score is less than a threshold indicating that the domain may be incorrect. In such a scenario, the fallback step attempts to search for additional possible domains. In one or more embodiments Block 318 may be executed after, before or in parallel with Block 316. FIG. 3 shows Block 318 as being executed subsequent to Block 316. At Block 318, each vector structure in the vector store is searched to obtain result embeddings that are top threshold number of matches for the user query embedding, as a fallback step. In one embodiment, the user query answer service sends a request to the vector store with at least the user query embedding. The vector store searches each vector structure in the vector store to obtain result embeddings and returns the result embeddings to the user query answer service.

In Block 320, the answer to the user query is generated by the answer generation model. In one embodiment, the user query answer service provides the result embeddings obtained from Block 318 as input data to the answer generation model. By way of example, the answer generation model may include answer generation functionality that may be exposed via an application programming interface (API) invokable via computer program code to generate answers in natural language using embeddings as input parameters. Subsequently the answer is transmitted to the user.

In Block 314, the answer to the user query is generated by the answer generation model. In one embodiment, the user query answer service provides the result embeddings obtained from Block 306, from the vector structures corresponding to those vector indices that have composite scores higher than the composite score threshold, as input to the answer generation model. By way of example, the answer generation model may include answer generation functionality that may be exposed via an application programming interface (API) invokable via computer program code to generate answers in natural language using embeddings as input. Subsequently the user query answer service transmits the answer to the user.

Figure 4:
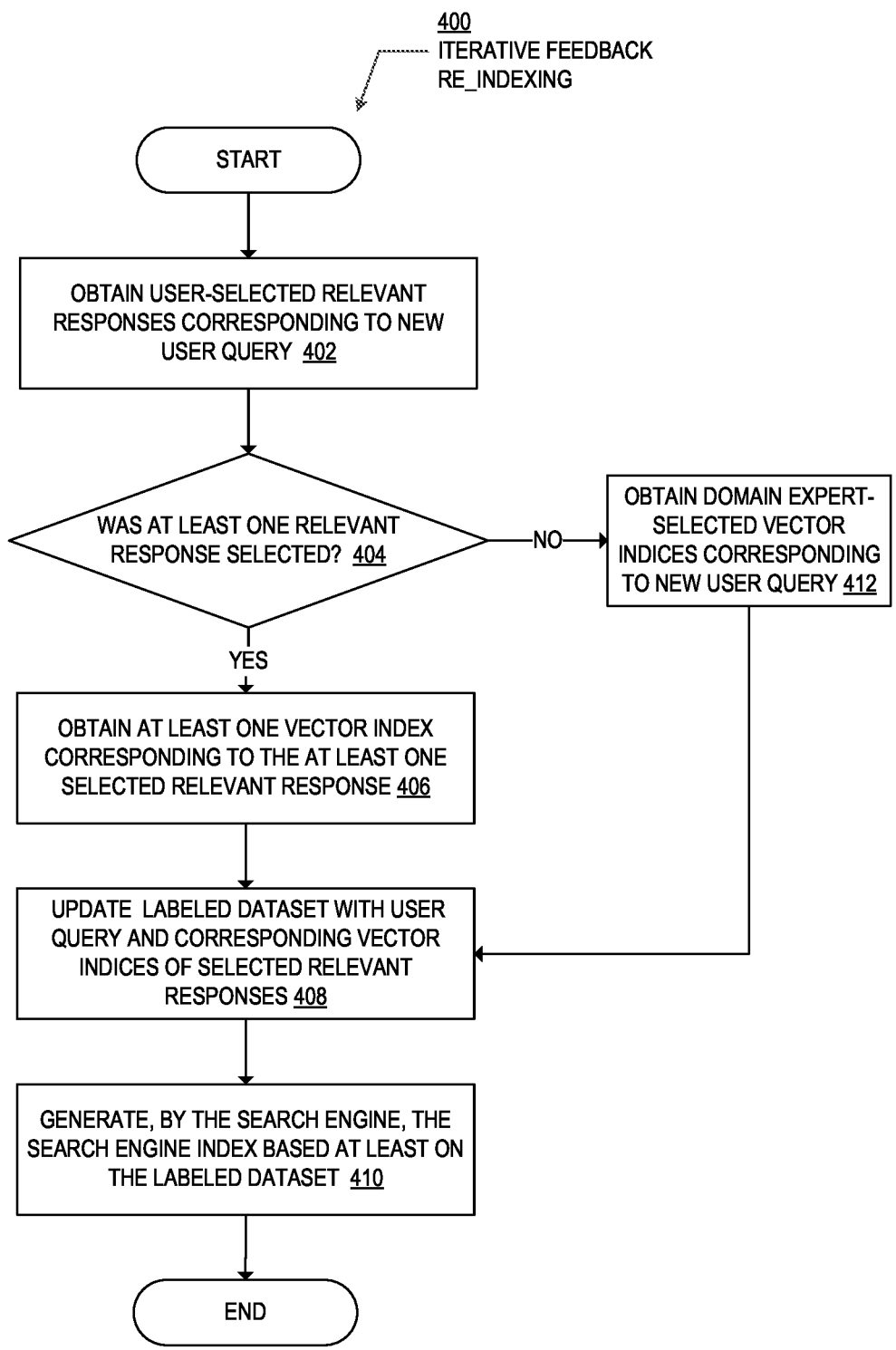
FIG. 4 is a flowchart for an iterative feedback reindexing of a search engine at runtime, in accordance with one or more embodiments.

FIG. 4 shows a flowchart depicting a method (400) for iterative feedback re-indexing of the search engine. The method (400) is described in reference to the components of FIG. 1. In one embodiment, various Blocks of the method (400) of FIG. 4, in particular, Blocks 402 through 408, are performed by one or more of the feedback service and the user query answering service.

In Block 402, a set of selected relevant responses to the new user query are obtained by the feedback service. The selected responses are determined to be the most relevant responses to the user query. In one or more embodiments, the user may perform the step of selecting at least one relevant response to the user query via the GUI of the user computing system. The GUI may be configured to present one or more graphical artifacts via the answer widget of the GUI to the user to select at least one response that is determined to be most relevant response to the user query. Subsequently, the user query answering service may receive at least one user-selected relevant response from the user computing system. The user query answering service may subsequently send the new user query and the selected relevant response to the feedback service.

In Block 404, a check is performed to ascertain whether the user selected a relevant response from the set of responses presented to the user from Block 402. Control passes to Block 406 when the user selects at a relevant response. If the user has not selected a relevant response, control passes to Block 412.

In Block 406, a vector index corresponding to the selected relevant response is obtained. In one or more embodiments, the feedback service may be configured to obtain a result embedding corresponding to the selected relevant response from the embedding model, and subsequently send the result embedding to the vector store. The vector store, in turn, may search the vector structures contained in the vector store to obtain a match to the result embedding. Further, the vector store may return the vector index corresponding to the vector structure that contains the match, to the feedback service.

By way of an example, the user selects a relevant response via the GUI of the user computing system. The user query answer service sends the selected relevant response to the feedback service. Subsequently, the feedback service obtains a result embedding from the embedding model corresponding to the selected relevant response. In the example, the result embedding matches a second embedding from a first vector structure. Further, the feedback service sends the result embedding to the vector store. The vector store searches the vector structures and finds a match, namely, the second embedding in the first vector structure. Subsequently, the vector store returns a first vector index from the first vector structure to the feedback service.

In Block 412, at least one domain expert-selected vector index corresponding to the new user query is obtained by the feedback service. In one embodiment, a domain expert maps the new user query to a vector index identifying the vector structure in the vector store which is determined to be most relevant to the user query. More particularly, the domain expert identifies a specific content domain to be relevant to the user query. Subsequently, the domain expert maps the user query to a vector index that identifies the specific content domain. In one embodiment, the domain expert may identify one or more specific content domains to be relevant to the user query, and correspondingly map the user query to one or more vector indices identifying the one or more specific content domains. In the context of the vector store, the vector index identifies the vector structure in the vector store that contains embeddings for the specific content domain. In one or more embodiments, the domain expert may perform the mapping step via a search engine administration application running on a domain expert computing system. The domain expert computing system may be a part of the server computing system, an independent system, or in one or more system configurations wherein the domain expert computing system is communicatively coupled to the server computing system. Subsequently, control is passed to Block 408.

In Block 408, the labeled dataset in the data repository is updated with the new user query and the corresponding vector index obtained from Block 406 when control has passed from Block 404 to 406. In a similar fashion, the labeled dataset in the data repository is updated with the new user query and the corresponding vector index obtained from Block 412, when control has passed from Block 404 to 412. In one embodiment, one or more vector indices may correspond to the new user query. Accordingly, the labeled dataset is updated with the new user query and the one or more corresponding vector indices. In one embodiment, updating the labeled dataset may include adding a new entry to a pre-existing labeled dataset. In one or more additional embodiments, updating the labeled dataset may include generating a labeled dataset with the new entry.

In Block 410, the search engine index is generated by the search engine based at least on the labeled dataset updated in Block 408. In one embodiment, the updated labeled dataset is used as input by the search engine to update the search engine index. The update of the search engine index at runtime optimizes the search engine to improve continuously in accurate mapping of a vector index to a user query. In one or more embodiments, the feedback service may run as a continuous background process on the server computing system to implement the update of the labeled dataset at runtime. In other embodiments, the feedback service may run the re-indexing process as a periodically performed batch process during runtime.

Figure 5:
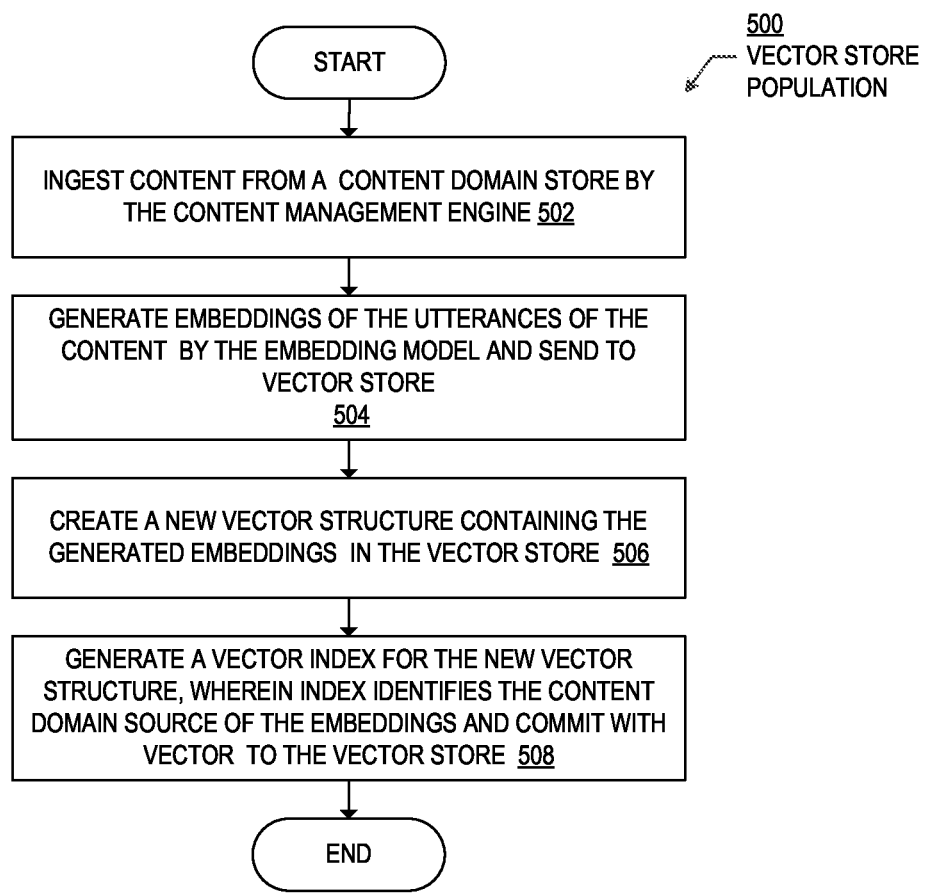
FIG. 5 is a flowchart for populating a vector store with vector structures characterizing a domain corpus, in accordance with one or more embodiments.

FIG. 5 shows a flowchart for a method (500) for populating a vector store. The method (500) may be performed during a population phase wherein the vector store is initialized and populated with embeddings pertaining to different content domain stores present in the data repository. The method (500) is described in reference to the components shown in FIG. 1. More particularly, Blocks 506 through 510 may be performed by one or more of the content management engine and the vector store.

In Block 502, content from a content domain store is ingested. In one or more embodiments, the content management engine may be configured to perform Block 502. In Block 504, the ingested content is preprocessed by the content management engine. In one embodiment, the content management engine performs the steps of cleaning, tokenizing, and converting the content into natural language.

In Block 504, embeddings of the content are generated by the embedding model and transmitted to the vector store. In one embodiment, the content management store is configured to send the preprocessed content to the embedding model. The embedding model, in turn, generates embeddings corresponding to the utterances in the content, and returns the embeddings to the content management engine. Furthermore, the content management engine is configured to send the generated embeddings to the vector store.

In Block 506, a new vector structure is created by the vector store and the embeddings received from the content management engine in Block 504 are added to the new vector structure. The vector structures are depicted in plurality in FIG. 1B as vector structure 1 through vector structure N.

In Block 508, a vector index corresponding to the vector structure created in Block 508 is generated by the vector store and added to the vector structure. The vector index maps the content domain store from Block 502 to the new vector structure from Block 508.

By way of an example, the vector store may create a new vector structure, first vector structure, and populates the first vector structure with first and second embeddings, and the like. The first and second embeddings are generated from utterances from content corresponding to a first content domain store. The vector store generates a new vector index, first vector index, that identifies the first content domain store. The vector store adds the first vector index to the first vector structure. Subsequently, the vector structure is committed to the vector store.

Figure 6:
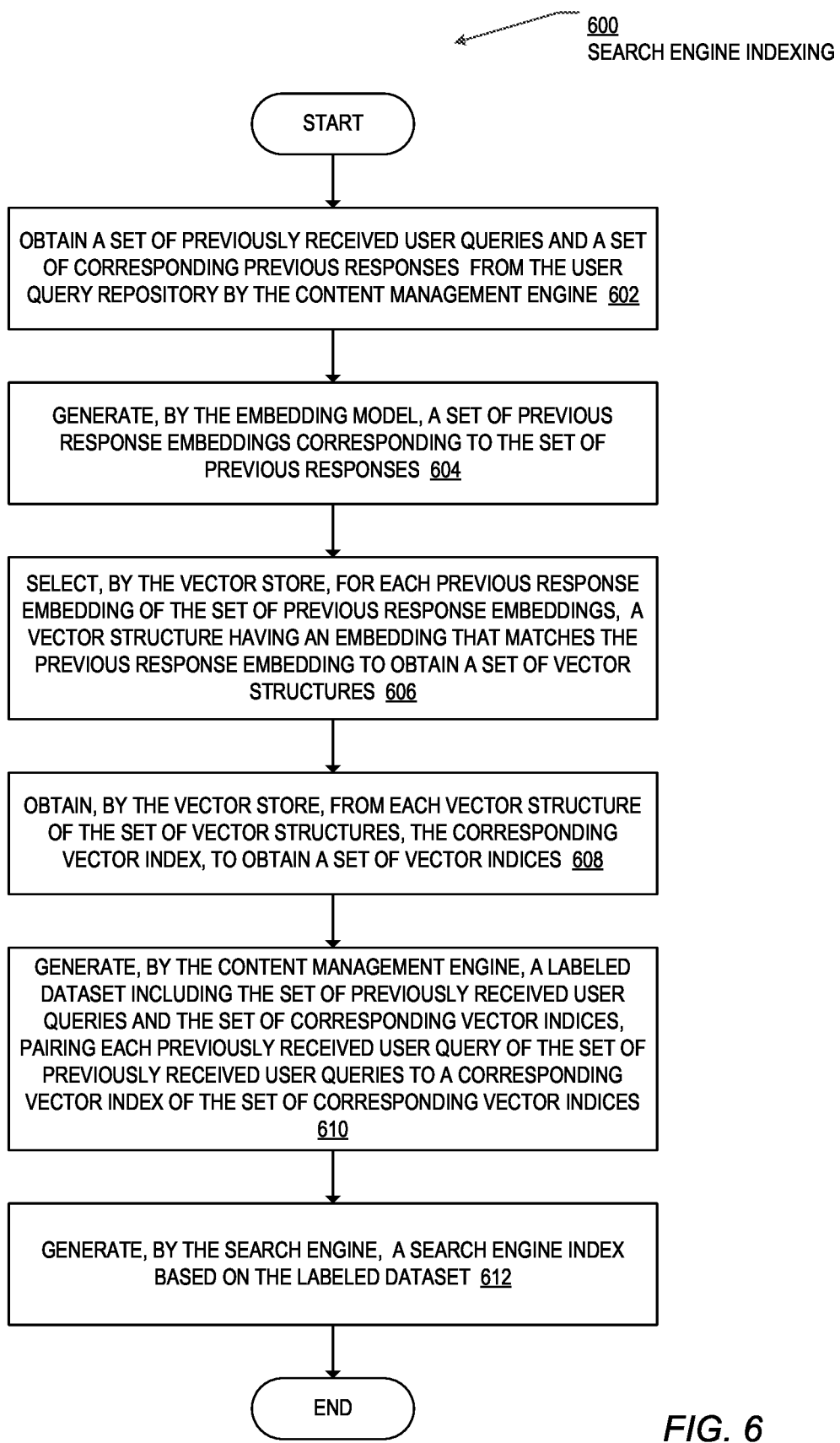
FIG. 6 is a flowchart for initializing and indexing a search engine, in accordance with one or more embodiments.

Turning to FIG. 6, a flowchart showing a method 600 for search engine initialization and indexing is presented. The method 600 is described in reference to the components of FIG. 1. More particularly, the content management engine, communicatively coupled with the user query repository, the embedding model, and the vector store may perform Blocks 602 through 608 and Block 610 may be performed by the search engine.

In Block 602, a set of previously received user queries and a set of corresponding previous responses is obtained from the user query repository by the content management engine. In one embodiment, the content management engine sends a request to the user query repository to retrieve previously received user queries and corresponding previous responses. In one or more embodiments, the content management engine may be configured to request the user query repository to retrieve user queries stored during a specific interval of time, for example, user queries stored in the user query repository during the past twenty-four hours, or past week, and the like. In one or more embodiments, the content management engine may request the user query repository to retrieve the complete set of previously received user queries and corresponding relevant results.

In Block 604, a set of previous response embeddings corresponding to the set of previous responses is generated by the embedding model. In one embodiment, the content management engine is configured to send the set of previous responses to the embedding model. Further the embedding model returns a set of previous response embeddings corresponding to the set of previous responses to the content management engine.

In Block 606, for each previous response embedding of the set of previous response embeddings, a vector structure having an embedding that matches the previous response embedding is selected by the vector store, to obtain a set of vector structures. In one embodiment, the content management engine sends the set of previous response embeddings obtained in Block 604 to the vector store. The vector store searches the vector structures within the vector store for embeddings matching the previous response embeddings sent by the content management engine. In one embodiment, the vector store determines the similarity of a result embedding to the embedding of a vector structure through top-K matching.

In Block 608, from each vector structure of the set of vector structures, the corresponding vector index is obtained by the vector store, to obtain a set of vector indices. In one embodiment, the vector store is configured to return the set of vector indices the content management engine.

In Block 610, a labeled dataset including the set of previously received user queries and the set of corresponding vector indices is generated by the content management engine, pairing each previously received user query of the set of previously received user queries to a corresponding vector index of the set of corresponding vector indices. In one embodiment, the content management engine is configured to generate the labeled dataset.

In Block 612, a search engine index is generated based on the labeled dataset. In one embodiment, the search engine is configured to receive the labeled dataset generated by the content management engine in Block 610 and generate a search engine index that maps each user query in the labeled dataset to at least one corresponding vector index.

FIG. 7A and FIG. 7B show examples in accordance with one or more embodiments. The examples are for explanatory purposes only and not intended to limit the scope of the claims.

FIG. 7A shows a search engine index table (702) that has two columns showing an example of a generated search engine index. The left column of the table, identified by column heading "Query" shows representative user queries and the right column of the table, identified by column heading "Vector index" shows corresponding representative vector indices. In one or more embodiments, the search engine index may further include one or more columns representative of data pertaining to the user query, vector structure, relevant results and the like.

FIG. 7A further shows a labeled dataset table (704), representative of an example of a labeled dataset. In a similar fashion to search engine index table (702), the left column of table 704, identified by column heading "Query" is representative shows representative user queries and the right column of the table, identified by column heading "Vector index" shows corresponding vector indices. In one embodiment, the labeled dataset may be updated by the feedback service during the feedback re-indexing process at runtime. In one or more embodiments, the content management engine may generate the labeled dataset during the search engine initialization and indexing process. Further, the labeled dataset may be used by the search engine to generate a new search engine index or update an existing search engine index.

FIG. 7B shows an example of a user interaction with an automated response system, more specifically, a chatbot widget. Reference numerals 706 and 708 are illustrations of a user interaction session with an automated response system in chatbot widgets.

The user enters the query "Recommend a good bookstore near me". The search engine searches the search engine index for matches to the user query and obtains two vector indices with relevancy scores, based on the search engine index table (702) from FIG. 7A. In the example, the vector indices obtained may be "Book_Ride" and "Provide_Book_Recommendation", corresponding to indexed user queries "Book a ride for me" and "Recommend a good book", respectively. The search engine may generate relevancy scores for the matched indexed user queries. In the example, since the word "Book" appears in two of the indexed queries, and the word "good" appears in one of the indexed queries, the relevancy scores of the vector indices may be determined as 40% for "Book_Ride" and 60% for "Provide_Book_Recommendation". Subsequently, in the example, the user query answer service sends the vector indices with the query embedding for the user query to the vector store. The vector store, in turn, searches for result embeddings similar to the query embedding in the vector structures corresponding to vector indices "Book_Ride" and "Provide_Book_Recommendation". The vector store returns result embeddings that are top K matched to the user query to the user query answer service and corresponding result similarity scores.

Subsequently, the composite scores for the vector indices are calculated, and both indices are determined to have composite scores greater than a pre-determined composite score threshold. Further, the result embeddings corresponding to the vector indices obtained from the vector store by the user query answer service and the query embedding of the user query entered by the user are sent to the answer generation model and the answer generation model returns the natural language responses "Uber or Lyft" and "Sapiens by Yuval Noah Harrari is a good book", shown in widget 706, to the user. In the example, the user is given the option to rate the responses. The user rejects both answers and enters "Not relevant" as the response. Consequently, the user query answer service launches an iteration of the feedback re-indexing process. Since the user has not selected a response, the feedback service sends the user query to a search engine administrative application on a domain expert computing system. A domain expert determines the relevant vector index for the query and returns the relevant vector index to the feedback service. The feedback service updates the labeled dataset as shown in the labeled dataset table (704). The search engine re-indexes the search engine index with the updated labeled dataset.

In a subsequent interaction with the chatbot, shown in widget 708, the user enters the query "Find a good bookstore near me". In the example, the search engine obtains the vector index "Bookstore_Search" from the search engine index and assigns a high relevancy score to the matching indexed user query "Find a bookstore near me". The user query answer service sends the vector index and the query embedding of the user query to the vector store. The vector store, in turn, searches the vector structure identified by the vector index for result embeddings that are top K matched to the query embedding. The vector store returns the result embeddings from the vector structure identified by the vector index and corresponding result similarity scores. The user query answer service calculates the composite score of the vector index based on the relevancy score of the indexed user query and the result similarity scores. In the example, the composite score is determined to be higher than the pre-determined composite score. Subsequently, the user query answer service sends the result embeddings and the query embedding of the user query entered by the user to the answer generation model. The answer generation model returns the response "2100 Shattuck Ave Berkeley CA" to the user. In the example, the user enters a subsequent query "Tell me the name of a good book". The search engine searches the search engine index and returns the relevant vector index "Provide_Book_Recommendation". The subsequent workflow similar to the steps of the example described in reference to widget 706 results in a relevant response "Sapiens by Yuval Noah Harrari is a good book".

Figure 8A:
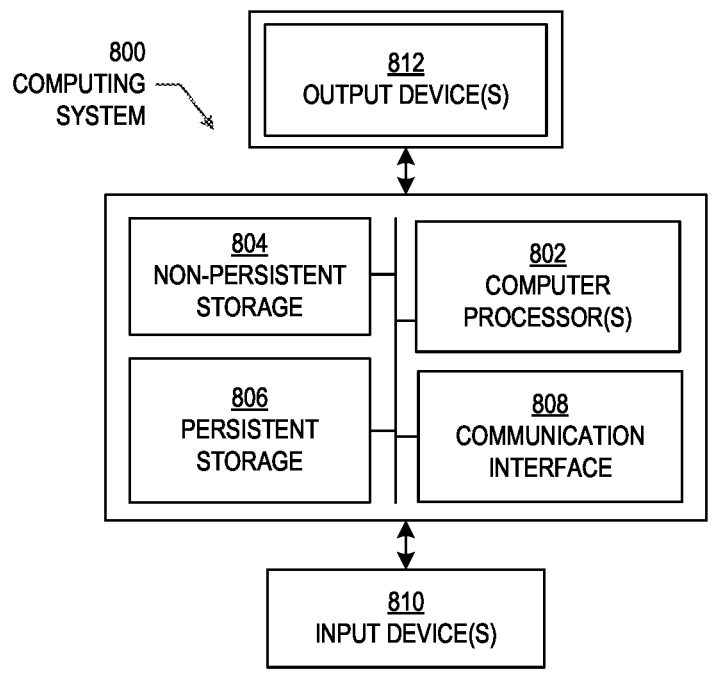
FIGS. 8A and 8B show a computing system in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804), persistent storage (806), a communication interface (808) (e.g., Bluetooth interface, infrared interface, network interface, optical interface, etc.), and numerous other elements and functionalities that implement the features and elements of the disclosure. The computer processor(s) (802) may be an integrated circuit for processing instructions. The computer processor(s) may be one or more cores or micro-cores of a processor. The computer processor(s) (802) includes one or more processors. The one or more processors may include a central processing unit (CPU), a graphics processing unit (GPU), a tensor processing unit (TPU), combinations thereof, etc.

The input devices (810) may include a touchscreen, keyboard, mouse, microphone, touchpad, electronic pen, or any other type of input device. The input devices (810) may receive inputs from a user that are responsive to data and messages presented by the output devices (812). The inputs may include text input, audio input, video input, etc., which may be processed and transmitted by the computing system (800) in accordance with the disclosure. The communication interface (808) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the output devices (812) may include a display device, a printer, external storage, or any other output device. One or more of the output devices may be the same or different from the input device(s). The input and output device(s) may be locally or remotely connected to the computer processor(s) (802). Many diverse types of computing systems exist, and the aforementioned input and output device(s) may take other forms. The output devices (812) may display data and messages that are transmitted and received by the computing system (800). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 8B:
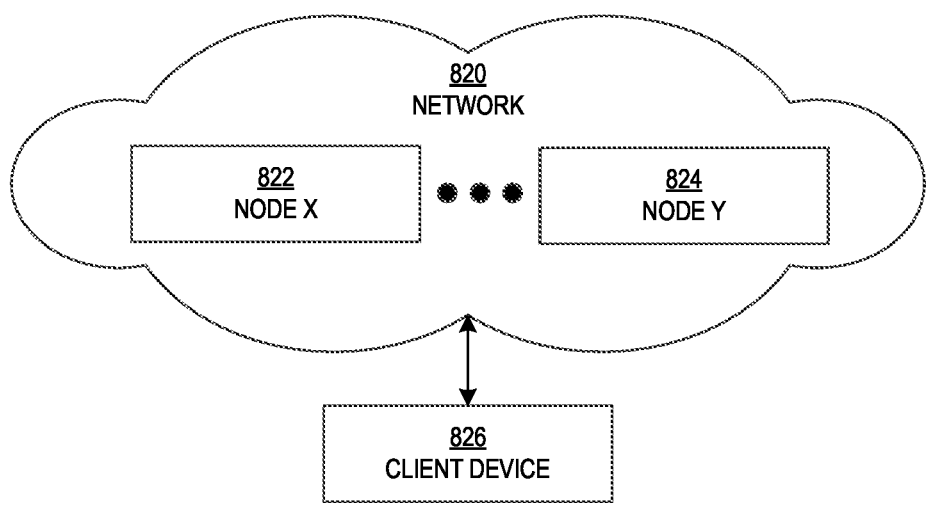

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826), including receiving requests and transmitting responses to the client device (826). For example, the nodes may be part of a cloud computing system. The client device (826) may be a computing system, such as the computing system shown in FIG. 8A. Further, the client device (826) may include and/or perform in entirety or a portion of one or more embodiments.

The computing system of FIG. 8A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:
   generating, by an embedding model, a new user query embedding for a new user query received from a user;
   obtaining, by a search engine from a search engine index:
      an indexed user query matching the new user query,
      a first vector index corresponding to the indexed user query, and
      a relevancy score corresponding to the indexed user query;
   selecting, from a plurality of vector structures in a vector store, a vector structure corresponding to the first vector index;
   obtaining, from the vector structure, a result embedding matching the new user query embedding;
   transmitting, by a user query answer service to an answer generation model, the result embedding; and
   receiving, by the user query answer service, an answer to the new user query from the answer generation model.

2. The method of claim 1, further comprising:
   generating a result similarity score for the result embedding;
   determining an index similarity score for the first vector index based on the result similarity score; and determining a composite score corresponding to the first vector index based on the relevancy score of the indexed user query and the index similarity score of the first vector index.

3. The method of claim 2, further comprising:
generating, by the answer generation model, the answer to the new user query, based on the result embedding corresponding to the first vector index, and responsive to the composite score being higher than a composite score threshold.

4. The method of claim 1, further comprising:
generating a result similarity score for the result embedding;
determining an index similarity score for the first vector index based on the result similarity score;
determining a composite score for the first vector index based on the relevancy score of the indexed user query and the index similarity score of the first vector index; and
obtaining an alternative result embedding responsive to the composite score being lower than the composite store threshold,
wherein the answer generation model generates the answer to the new user query based on at the least one alternative result embedding.

5. The method of claim 1, further comprising:
generating a result similarity score for the result embedding;
determining an index similarity score for the first vector index based on the result similarity score;
determining a composite score for the first vector index based on the relevancy score of the indexed user query and the index similarity score of the first vector index; and
initiating an iteration of feedback re-indexing for the search engine responsive to the composite score being lower than the composite score threshold.

6. The method of claim 5, wherein the feedback re-indexing comprises:
obtaining a selected response corresponding to the new user query;
obtaining a second vector index corresponding to the selected response;
updating a labeled dataset with the new user query and the second vector index; and
generating an updated search engine index based at least on the labeled dataset.

7. The method of claim 1, further comprising:
populating the vector store during a populating phase, wherein populating comprises:
ingesting content corresponding to a content domain store from a data repository,
generating, by the embedding model, an embedding corresponding to an utterance of the content, and
transmitting the embedding to the vector store.

8. The method of claim 7, further comprising:
creating a new vector structure comprising:
the embedding corresponding to the utterance, and
a new vector index corresponding to the new vector structure, wherein the new vector index identifies the content domain store; and
committing the new vector structure to the vector store.

9. The method of claim 1, further comprising:
obtaining, in an initialization phase, a set of previously received user queries and a set of corresponding previous responses from a user query repository;
generating, by the embedding model, a set of previous response embeddings corresponding to the set of previous responses;
selecting for each previous response embedding of the set of previous response embeddings, a vector structure having an embedding that matches the previous response embedding, to obtain a set of vector structures; and
obtaining, by the vector store, from each vector structure of the set of vector structures, a corresponding vector index, to obtain a set of corresponding vector indices.

10. The method of claim 9, further comprising:
generating, by the content management engine, a labeled dataset comprising the set of previously received user queries and the set of corresponding vector indices, wherein each previously received user query of the set of previously received user query is paired to the corresponding vector index of the set of corresponding vector indices; and
generating, by the search engine, a search engine index based on the labeled dataset.

11. A system, comprising:
at least one computer processor;
a user query answer service executing on the at least one computer processor and comprising:
an embedding model, and
a search engine;
a data repository comprising:
a user query repository,
a vector store,
a content domain store; and
an answer generation model executing on the at least one computer processor,
wherein:
the embedding model is configured to cause the at least one computer processor to generate a new user query embedding for a new user query received from a user,
the search engine is configured to cause the at least one computer processor to obtain:
an indexed user query matching the new user query from a search engine index,
a first vector index corresponding to the indexed user query, and
a relevancy score corresponding to the indexed user query,
the vector store is configured to cause the at least one computer processor to:
select a vector structure corresponding to the first vector index from a plurality of vector structures in the vector store,
obtain a result embedding matching the new user query embedding from the vector structure, and
the user query answer service is configured to cause the at least one computer processor to:
transmit the result embedding to the answer generation model, and
receive an answer to the new user query from the answer generation model.

12. The system of claim 11, wherein:
the vector store is further configured to cause the at least one computer processor to generate a result similarity score for the result embedding,
the user query answer service is further configured to cause the at least one computer processor to:
determine an index similarity score for the first vector index based on the result similarity score, and determine a composite score corresponding to the first vector index based on the relevancy score of the indexed user query and the index similarity score of the first vector index; and the answer generation model is further configured to cause the at least one computer processor to:

generate the answer to the new user query, based on the result embedding from the vector structure corresponding to the first vector index, responsive to the composite score corresponding to the first vector index being higher than a composite score threshold.

13. The system of claim 11, wherein the vector store is further configured to cause the at least one computer processor to generate a result similarity score for the result embedding;

the user query answer service is further configured to cause the at least one computer processor to:

determine an index similarity score for the first vector index based on the result similarity score, and determine a composite score for the first vector index based on the relevancy score of the indexed user query and the index similarity score of the first vector index;

the vector store is further configured to cause the at least one computer processor to obtain an alternative result embedding, wherein the alternative result embedding matches the user query, responsive to the composite score corresponding to the first vector index being lower than the composite store threshold, and the answer generation model is further configured to cause the at least one computer processor to generate the answer to the new user query, based on at the least one alternative result embedding.

14. The system of claim 11, wherein:

the vector store is further configured to cause the at least one computer processor to generate a result similarity score for the result embedding, the user query answer service is further configured to cause the at least one computer processor to:

determine an index similarity score for the first vector index based on the result similarity score, determine a composite score for the first vector index based on the relevancy score of the indexed user query and the index similarity score of the first vector index, and initiate an iteration of feedback re-indexing of the search engine responsive to the composite score being lower than the composite score threshold.

15. The system of claim 14, further comprising:

a feedback service, configured to cause the at least one computer processor to:

obtain, during one iteration of feedback re-indexing of the search engine, a selected response corresponding to the new user query, obtain a second vector index corresponding to the selected response, and update a labeled dataset with the new user query and the second vector index, and wherein the search engine is further configured to generate an updated search engine index based at least on the labeled dataset.

16. The system of claim 11, further comprising a content management engine, configured to cause the at least one computer processor to:

ingest content corresponding to the content domain store from the data repository, obtain an embedding corresponding to an utterance of the content from the embedding model, and transmit the embedding to the vector store.

17. The system of claim 16, wherein the vector store is further configured to:

create a new vector structure comprising:

the embedding corresponding to the utterance, and a new vector index corresponding to the new vector structure, wherein the new vector index identifies the content domain store, and commit the new vector structure to the vector store.

18. The system of claim 11, wherein:

the content management engine is further configured to cause the at least one computer processor to obtain, in an initialization phase, a set of previously received user queries and a set of corresponding previous responses from a user query repository, the embedding model is further configured to cause the at least one computer processor to generate a set of previous response embeddings corresponding to the set of previous responses, the vector store is further configured to cause the at least one computer processor to:

select, for each previous response embedding of the set of previous response embeddings, a vector structure having an embedding that matches the previous response embedding, to obtain a set of vector structures, and obtain, from each vector structure of the set of vector structures, a corresponding vector index, to obtain a set of corresponding vector indices.

19. The system of claim 18, wherein:

the content management engine is further configured to cause the at least one computer processor to generate a labeled dataset comprising the set of previously received user queries and the set of corresponding vector indices, wherein each previously received user query of the set of previously received user query is paired to the corresponding vector index of the set of corresponding vector indices, and the search engine is further configured to cause the at least one computer processor to generate a search engine index based on the labeled dataset.

20. A method comprising:

generating, by an embedding model, a new user query embedding for a new user query received from a user;

obtaining, by a search engine, from a search engine index, an indexed user query matching the new user query;

obtaining, by the search engine, from the search engine index, a vector index corresponding to the indexed user query;

selecting, from a plurality of vector structures in a vector store, a vector structure corresponding to the vector index;

obtaining, from the vector structure, a result embedding similar to the new user query embedding;

determining, by the vector store, a result similarity score corresponding to the result embedding;

determining, by a user query answer service, an index similarity score corresponding to the vector index based on the result similarity score;

determining, by the user query answer service, a composite score corresponding to the vector index, based on the relevancy score corresponding to the indexed user query and the index similarity score corresponding to the vector index; and generating, by an answer generation model, the answer to the new user query, based on the result embedding from the vector structure corresponding to the vector index, responsive to the composite score corresponding to the vector index being higher than a composite score threshold.

* * * * *